(12) United States Patent
Oh et al.

(10) Patent No.: US 8,883,056 B2
(45) Date of Patent: Nov. 11, 2014

(54) METHOD FOR PREPARING CELLULOSE-BASED FILM AND CELLULOSE-BASED FILM

(75) Inventors: Young Sae Oh, Busan (KR); Woo Chul Kim, Daegu (KR); Jong Chul Jung, Gumi-si (KR)

(73) Assignee: Kolon Industries, Inc., Kwacheon-si (KR)

( * ) Notice: Subject to any disclaimer, the term of this patent is extended or adjusted under 35 U.S.C. 154(b) by 1033 days.

(21) Appl. No.: 12/331,765

(22) Filed: Dec. 10, 2008

(65) Prior Publication Data

US 2009/0152493 A1 Jun. 18, 2009

(30) Foreign Application Priority Data

Dec. 10, 2007 (KR) .................. 10-2007-0127868

(51) Int. Cl.
| | | |
|---|---|---|
| *D01D 5/12* | (2006.01) | |
| *B29C 39/14* | (2006.01) | |
| *D01D 5/06* | (2006.01) | |
| *C08J 5/18* | (2006.01) | |

(52) U.S. Cl.
CPC ............... *C08J 5/18* (2013.01); *C08J 2301/02* (2013.01)
USPC ................. 264/210.1; 264/180; 264/559

(58) Field of Classification Search
USPC ................. 252/182.12; 264/210.1, 180, 559
See application file for complete search history.

(56) References Cited

U.S. PATENT DOCUMENTS

| 6,051,335 A * | 4/2000 | Dinh-Sybeldon et al. ..... 429/142 |
| 2008/0023873 A1* | 1/2008 | Mankad et al. ............... 264/180 |

* cited by examiner

*Primary Examiner* — Monique Peets
(74) *Attorney, Agent, or Firm* — Sughrue Mion, PLLC

(57) ABSTRACT

Disclosed herein is a method for preparing a cellulose-based film from raw material pulp, the method including the steps of: preparing a dope from a composition comprising 5-15 wt % of a pulp having an alpha-cellulose content of more than 90% and 85-95 wt % of an aqueous N-methylmorpholine-N-oxide solution; extruding the dope from a die onto a running support; casting the extrudate to form a sheet-shaped material; washing the cast sheet with water to remove N-methylmorpholine-N-oxide therefrom; and drying the washed sheet. The method enables the cellulose-based film to be prepared from environmentally friendly wood pulp through an environmentally friendly process.

15 Claims, 3 Drawing Sheets

METHOD FOR PREPARING CELLULOSE-BASED FILM AND CELLULOSE-BASED FILM

This is a non-provisional application which claims priority from Korean patent application 10-2007-0127868 filed on Dec. 10, 2007, and is incorporated herein by reference.

BACKGROUND OF THE INVENTION

1. Field of the Invention

The present invention relates to a method for preparing a cellulose-based film based on pulp obtained by chemically treating wood and a cellulose-based film.

2. Description of the Prior Art

The increase of population, the development of various industries and the rapid development of the fast food industry have resulted in the phenomenon that disposable plastic packaging waste is generated in large quantities. Such plastic packaging waste semi-permanently maintains its original properties without being degraded, and thus interferes with the normal cycling of matter in the natural ecosystem and has a serious adverse effect on the living environment of people.

Thus, efforts have been made to reduce the amount of wasted plastic products through the promotion of plastic recycling, but these are not considered to be an ultimate method.

Biodegradable plastics receive attention along with the recycling of plastics. Although a standard world-wide definition for biodegradable plastics has not yet been established, biodegradable plastics can be defined as materials that have functions similar to those of general plastics in the use thereof and are biodegradable by microorganisms playing the most fundamental role in the cycling of matter in ecosystems.

Meanwhile, cellulose is the main component of higher plant cell walls and is a polysaccharide that makes up the majority of xylem. It is a straight-chain polymer of D-glucose units linked by β-1,4 bonds and represented by the chemical formula $(C_6H_{10}O_5)n$. Also, it is an odorless, white solid and is insoluble in water. In addition, it has significantly strong resistance to alkali but is hydrolyzed by acid to glucose.

Cellulose is an organic compound next to coal in natural abundance and is considered to be an industrially very important resource. About 50% of wood and about 98% of cotton consist of cellulose. Cellulose is also found in bacteria, seaweed, and the shell of sea squirts, in addition to higher plants, and is also contained in an extracellular secretion of acetic acid bacteria. Furthermore, the sulfuric acid ester of cellulose is also present in the mucus of shellfishes. Cellulose is degraded by the cellulase of fungi bacteria, mollusks or the like, and then finally converted to glucose. Cellulose is a material having the highest molecular weight among polysaccharides, and the molecular weight thereof in the native state is in the range from a few tens of thousands to several hundreds of thousands.

An aggregation of a number of cellulose molecules forms fiber, and the minimum unit thereof is a micelle that is more than 0.05 nm in diameter and more than 0.6 nm in length. The results of X-ray analysis revealed that the micelle has a crystalline structure. The boundary between micelles is a non-crystalline region, and when cellulose fiber is immersed in water or dilute alkali it swells by absorbing the liquid, suggesting that the liquid infiltrates into the non-crystalline region. When cellulose fiber is immersed in concentrated alkali, the liquid infiltrates into the crystalline region. Cellulose has strong resistance to chemicals and is not invaded by microorganisms. In addition to being used as a raw material for producing paper and clothing, cellulose derivatives are used in various fields.

Among them, recycled cellulose, so-called cellophane, is an environment-friendly biodegradable packaging material, because it is based on pulp obtained by chemically treating wood. It has advantages in that it can be easily torn by hand, can be twisted and has no static electricity, such that dust does not adhere thereto. In addition, it shows excellent properties, including excellent transparency, gloss, heat resistance, oil resistance, chemical resistance and printability. A process for preparing a viscose solution and recycling cellulose has been used so far to process cellulose in the form of a film. However, such a viscose process causes serious pollution problems, that is, the environmentally harmful substance $CS_2$ must be used in the preparation of the viscose solution, and the harmful substances $CS_2$ and $H_2S$ are emitted during the recycling process. In addition, the viscose process is complicated, leading to the increase in production cost. Due to such problems, the use thereof is considerably decreasing.

The known applications of cellophane films include, in addition to general applications such as multicolor printing, lamination and twist packaging, various applications such as release films for fishing rods, flat panels and faced sheets, raw materials for cellophane tapes, packaging materials for processed meat products, overlapping films for cigarettes and cassette tapes, high moisture-proof films for soybean pastes, hard-boiled foods and drugs.

Currently, the demand for cellophane is decreasing due to the environmental harmfulness of a preparation process thereof and the high cost thereof. However, as the demand for biodegradable polymers has recently increased due to the launching of the Green Round in advanced countries and the construction of the ISO 14000 environmental management systems, cellophane is receiving attention again. Particularly, in order to fundamentally cope with international environmental regulations, including OECD restrictions on product process methods in OECD, restrictions on environmentally non-friendly products, and EU restrictions on electronic/electrical product waste disposal, all the processes of production must be converted to clean production systems.

In view of this fact, there is an urgent need to develop a method enabling the environmentally friendly production of a cellulose-based film advantageous in terms of environmentally friendly features.

SUMMARY OF THE INVENTION

The present invention provides a method enabling a cellulose-based film to be prepared from environmentally friendly wood pulp through an environmentally friendly process.

Also, the present invention provides a method of preparing a cellulose-based film from environmentally friendly pulp, in which a process for preparing alkali cellulose, a xanthation process and the like may be omitted so as to eliminate the use of NaOH or $H_2SO_4$, thus reducing chemical costs, and in which process efficiency can be increased, thus reducing the use of utilities.

Furthermore, the present invention provides a method for preparing a cellulose-based film, in which the environmentally harmful substance $CS_2$ is not used.

In addition, the present invention provides a method for preparing a cellulose-based film, in which the environmentally harmful substance $CS_2$ or $H_2S$ is not emitted.

The present invention provides a method in which a cellulose-based film having excellent properties, including excellent transparency, gloss, dimensional stability, heat resistance, oil resistance, chemical resistance and printability, can be prepared in an environmentally friendly manner.

Furthermore, the present invention provides an environmentally friendly cellulose-based film which has excellent properties, including excellent transparency, gloss, dimensional stability, heat resistance, oil resistance, chemical resistance and printability, and, at the same time, contains no environmentally harmful substance.

In addition, the present invention provides a cellulose-based film which can substitute for a prior cellulose-based film (i.e., cellophane), which is prepared according to a viscose process and for which Korea depends entirely on imports, thereby reducing the import dependence of the cellulose-based film.

According to an aspect of the present invention, there is provided a method for preparing a cellulose-based film, the method comprising the steps of: preparing a dope from a composition comprising 5-15 wt % of a pulp having an alpha-cellulose content of more than 90% and 85-95 wt % of an aqueous N-methylmorpholine-N-oxide solution; extruding the dope from a die onto a running support; casting the extrudate to form a sheet-shaped material; washing the cast sheet with water to remove N-methylmorpholine-N-oxide therefrom; and drying the washed sheet.

In an aspect of the present invention, the step of preparing the dope may be carried out at a temperature of 90-150° C.

In an aspect of the present invention, an additive may be used in the step of preparing the dope.

In an aspect of the present invention, the additive may be an additive for minimizing the degradation of cellulose at high temperature or plasticizer.

In an aspect of the present method, the concentration of N-methylmorpholine-N-oxide in the aqueous N-methylmorpholine-N-oxide solution may be 85-95 wt %.

In an aspect of the present invention, the running support may be in the type of a roll or a belt.

In the aspects of the present invention, the step of casting the extrudate to form the sheet-shaped material may be carried out in such a manner that the running support is allowed to run in a state in which a portion of the running support is immersed in a solidifying bath.

In the aspects of the present invention, the step of casting the extrudate to form the sheet-shaped material may be carried out in such a manner that about 20-80% of the contact area of the running support with the extruded sheet is immersed in the solidifying bath.

In the aspects of the present invention, the step of casting the extrudate to form the sheet-shaped material may be carried out such that the extruded sheet coming in contact with the rung support is separated from the running support at least 1 second after the immersion thereof in the solidifying bath.

In the aspects of the present invention, the step of casting the extrudate to form the sheet-shaped material may be carried out such that the extruded sheet coming in contact with the rung support is separated from the running support at least 3 seconds after the immersion thereof in the solidifying bath.

In the aspects of the present invention, the temperature of the running support may be higher than 0° C. and, at the same time, lower than the temperature of the extrudate by 10° C.

In the aspects of the present invention, the running support may be made of an SUS material having one coating layer selected from the group consisting of a hard chromium coating, a tungsten carbide coating, an alumina-based ceramic coating, a titanium coating and a titanium oxide coating.

In the aspects of the present invention, the solidifying bath may be maintained at a temperature lower than the temperature of the running support.

In the aspects of the present invention, the solidifying bath may be controlled such that the concentration of N-methylmorpholine-N-oxide is 3-50%.

In the aspects of the present invention, the washing step may be carried out such that the concentration of N-methylmorpholine-N-oxide in the washed sheet is less than 50 ppm.

In the aspects of the present invention, the washing step may be carried out using a method of sequentially washing the cast sheet by passing the sheet through a plurality of water washing stages sequentially disposed in the movement direction of the sheet.

In the aspects of the present invention, the washing step may be carried out using a method of supplying purified water so as to maintain the concentration of washing water in each water washing stage at a constant level, in which the supply of purified water may be carried out by allowing purified water to flow in a direction from a water washing stage at the end in the movement direction of the sheet toward a water washing stage at the entrance in the movement direction of the sheet.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Hereinafter, the present invention will be described in further detail with reference to the accompanying drawings.

Figure 1:
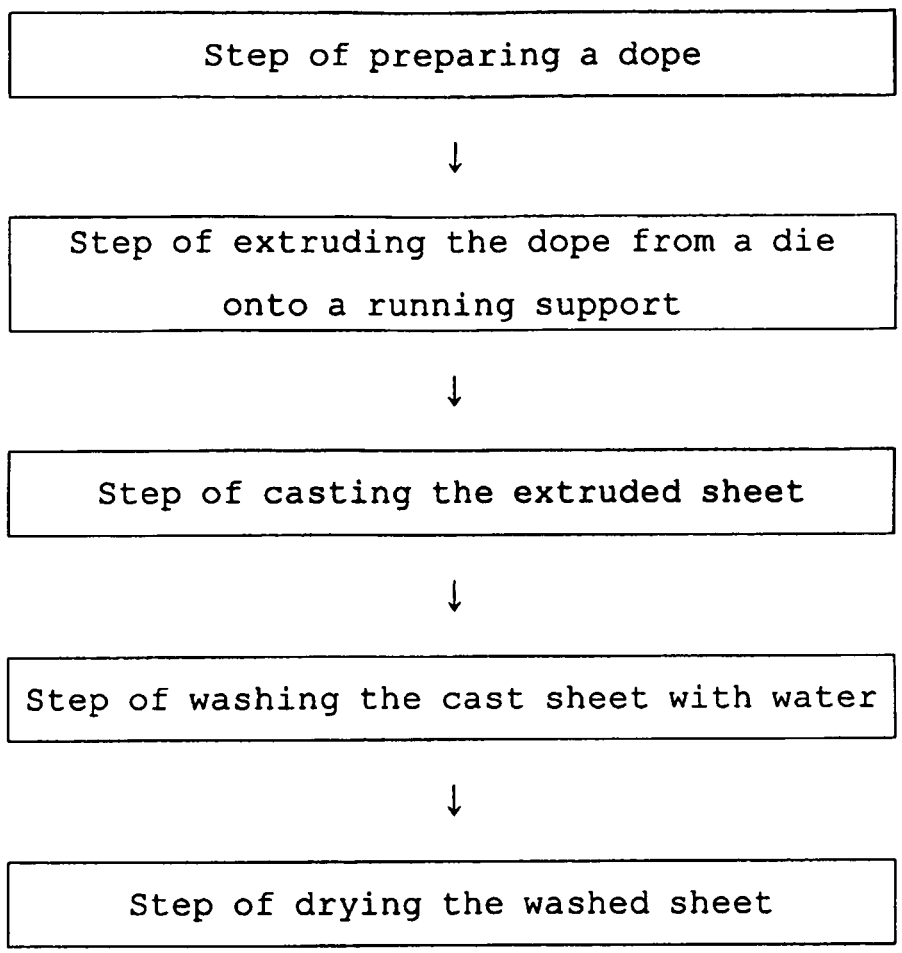
FIG. 1 is a schematic view of a method for preparing a cellulose-based film according to the present invention.

FIG. 1 schematically shows a method for preparing a cellulose-based film according to the present invention. As shown in FIG. 1, the method of the present invention broadly comprises: a step of preparing a dope from raw material pulp, a solvent and, if necessary, additives; a step of extruding the prepared dope from a die onto a running support; a step of casting the extruded sheet; a step of washing the cast sheet with water; and a step of drying the washed sheet.

Figure 2:
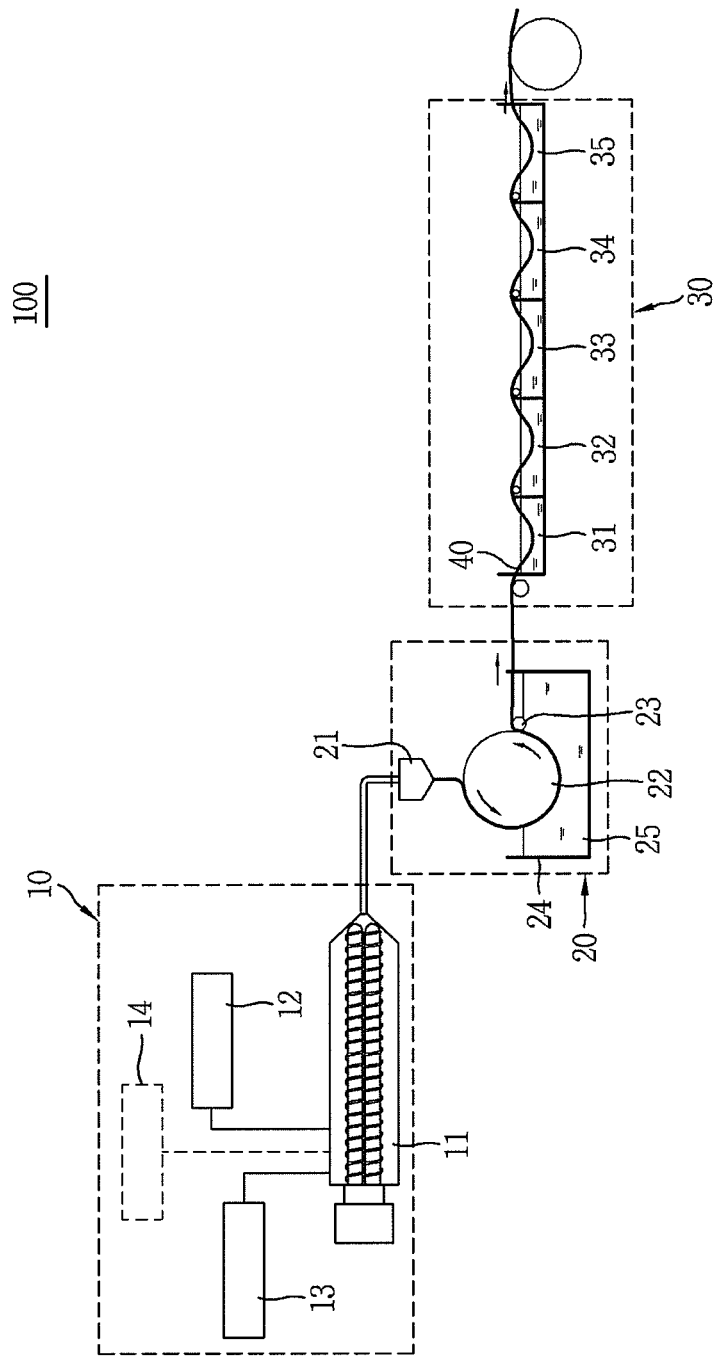
FIG. 2 is a schematic view of a system for preparing a cellulose-based film according to the present invention.

FIG. 2 is a schematic diagram of a film preparation system for carrying out a series of such steps. As shown in FIG. 2, a film preparation system 100 comprises a dope preparation unit 10, a casting unit 20, a water washing unit 30, a drying unit (not shown) and a winding unit (not shown).

In an embodiment, the dope preparation unit 20 includes a pulp supply unit 13, a solvent supply unit 12 and, if necessary, an additive supply unit 14. In addition, the dope preparation unit 20 also includes a dope preparation apparatus 11 in which the materials for dope preparation supplied from the respective supply units are mixed with each other and subjected to processes such as melting and kneading. In a specific embodiment of the present invention, the solvent supply unit 12 is a tank in which NMMO is concentrated and from which NMMO highly concentrated under vacuum using water and NMMO is supplied.

Cellulose having a molecular weight of $(C_6H_{10}O_5)n$ is a linear polymer of β-D-glucose that is not melted by heat and is poorly soluble in general polar solvents. Such physical properties are attributable to strong intermolecular hydrogen bonds due to three hydroxyl groups in the glucose unit. The intermolecular hydrogen bond strength of cellulose can be inferred from the fact that cellulose is insoluble even in DMF or DMSO which have solubility parameter values most similar to that of cellulose.

During the past 30 years, many scientists have made various efforts to easily dissolve cellulose and, as a result, many solvent systems have been developed and reported. Among them, a solvent which has commercially available requirements, that is, a recovery rate of more than 90%, no toxicity and imparting good physical properties to a final product, is N-methylmorpholine-N-oxide (hereinafter abbreviated as "NMMO"), and particularly, the monohydrate of NMMO was found to most readily dissolve cellulose, and thus studies on the industrialization thereof have received focus. NMMO has very low toxicity, can be recovered in an amount of more than 99.9% and is biodegraded over a long period of time. The results of various studies on the toxicity of NMMO revealed that NMMO has toxicity lower than that of ethanol for rats, crawfishes, fishes, seaweed, bacteria, and the results of acute toxicity experiments on rats showed that the lethal dose $LD_{50}$ (where 50% of the experimental rats die) of NMMO was significantly higher that those of several chemicals. Based on such experimental results, the Korean Ministry of Environment recognized AMMO as a non-toxic substance. NMMO that is a solvent for use in the preparation of a cellulose dope is generally marketed in the form of an aqueous solution containing about 50 NMMO. However, in the preparation of the film according to the present invention, it is preferable in terms of pulp solubility that the concentration of AMMO in aqueous AMMO solution which is suitable for preparing a cellulose dope by dissolving cellulose pulp be about 85-95 wt %.

In the pulp supply unit 13, the cellulose sheet is powdered in a grinding machine equipped with a screen filter, and the powder as raw material pulp is supplied through a separate pulp powder storage tank. Herein, the raw material pulp preferably has an alpha-cellulose content of more than 90% in terms of solubility and product properties.

Various structures and mechanisms may be applied to the dope preparation apparatus 11. In one embodiment of the present invention, the dope preparation apparatus may be a twin-screw extruder in which the raw material powder and the aqueous NMMO solution may be supplied and subjected to a kneading process and a melting process, thus preparing a uniform dope. In the preparation of the dope, the pulp is preferably used in an amount of 5-15 wt % based on the total weight of the dope. If the content of the pulp in the dope composition is less than 5 wt %, a film having uniform thickness cannot be obtained because the viscosity of the dope is low, and the content of the pulp exceeds 15 wt %, the dope does not uniformly spread in the transverse direction (TD) due to high viscosity, thus forming stripes on a sheet.

The preparation of the dope is preferably performed at a temperature of 90-150° C. in terms of the solubility of NMMO and the prevention of thermal degradation of cellulose. In the preparation of the dope, an additive for preventing thermal degradation, that is, an antioxidant or a plasticizer, may further be used. Such additives may be supplied into the dope preparation apparatus 11 through a separate additive supply unit 14. Alternatively, the additives may be fed into the solvent supply unit 12. The method for adding the additives is not critical to the present invention. An example of the antioxidant may be propyl gallate.

As shown in FIG. 2, the dope prepared in the dope preparation apparatus 11 is extruded through a die 21 and is subjected to a casting process. As shown in FIG. 2, an example of a system for carrying out this casting process may comprise the die 21 for extruding the dope from the dope preparation apparatus 11, a running support 22 for casting the sheet extruded from the die, a solidifying bath 24 containing water 25 for solidifying the extruded sheet while extracting a suitable amount of a solvent from the extruded sheet, and a guide roll 23 for transferring the extruded sheet from the running support to a subsequent process.

Figure 3:
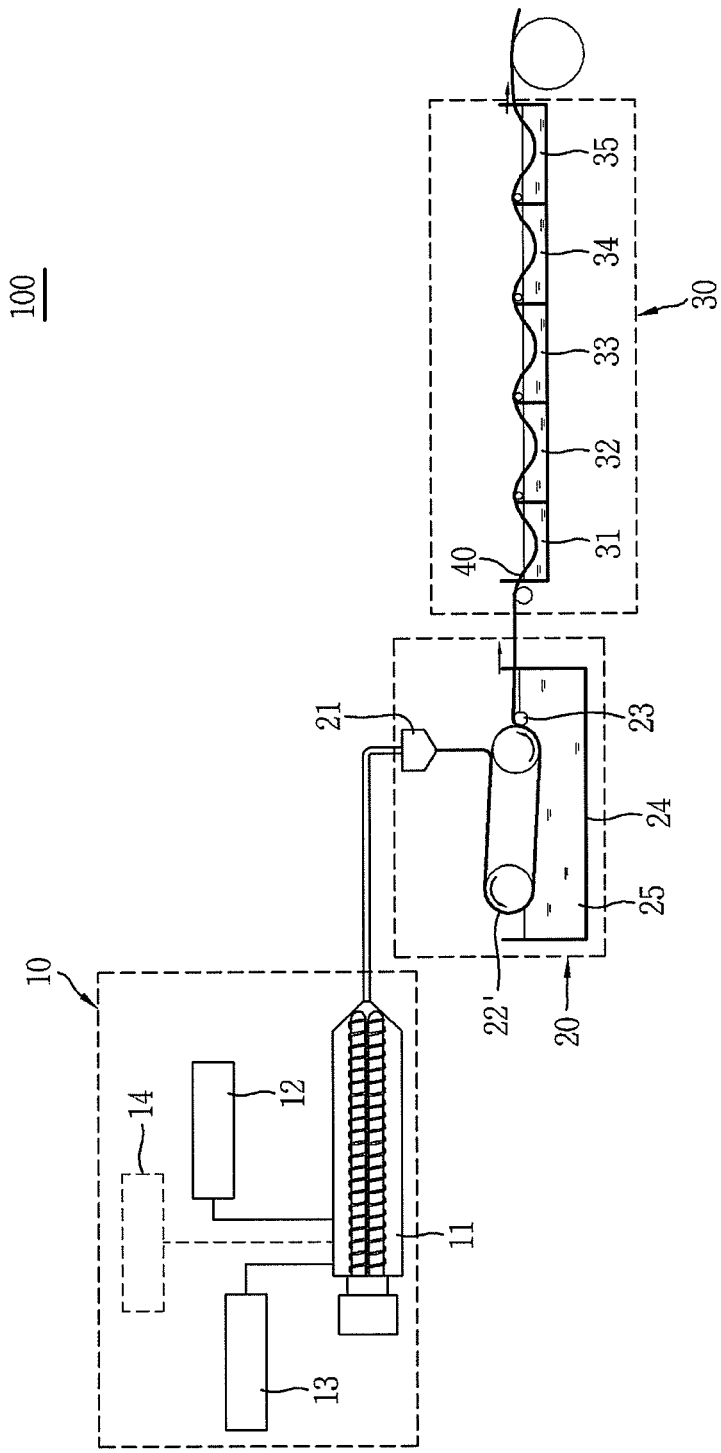
FIG. 3 is a schematic view of another system for preparing a cellulose-based film according to the present invention.

After the dope is prepared, it is extruded from the die 21 onto the running support 22. Herein, the running support that is a transfer means may be in the type of a roll as shown in FIG. 2 or a belt as shown in FIG. 3. A given gap may be provided between the die 21 and the running support 22 or 22' in order to control the width and thickness of the film.

The dope extruded from the die 21 onto the running support 22 or 22' is applied on the running support 22 or 22' and subjected to the casting process which is an important factor for the stable formation of the sheet. In the casting process, the running support 22 or 22' is allowed to run in a state in which a portion thereof is immersed in the water 25 of the solidifying bath. The reason why the running support 22 or 22' is allowed to run in a state in which a portion thereof is immersed in the solidifying bath is to extract a suitable amount of NMMO contained in the dope applied to the running support, thus enabling the dope to be formed into a sheet.

As used herein, the term "portion of the running support" means that about 20-80% of the contact area of the running support with the extruded sheet is immersed. If the degree of immersion of the running support is excessively high, an eddy will occur in the solidifying bath, thus making the surface of the separated sheet poor, and if the degree of immersion of the running support is low, it can be difficult to separate the sheet from the running support.

Meanwhile, the running support 22 or 22' must be immersed for at least 1 second after it is immersed in the solidifying bath in a state in which the extruded sheet comes in contact therewith, such that a uniform cast sheet can be obtained. Preferably, the extruded sheet is separated from the running sheet after the running support is immersed in the solidifying bath for at least 3 seconds in a state in which the extruded sheet comes in contact with the running support.

The temperature of the running support is preferably higher than 0° C. and, at the same time, lower than the temperature of the extrudate by about 10° C. If the temperature of the running support is excessively high, boiling can occur in the extruded sheet, thus causing a problem in the formation of a film.

Particularly, if the running support is in the type of a roll, there is no particular limitation on the material of the roll, but in view of stable sheet formation and easy separation, the material of the roll may be an SUS material having one coating layer selected from the group consisting of a hard chromium coating, a tungsten carbide coating, an alumina-based ceramic coating, a titanium coating and a titanium oxide coating.

Meanwhile, the temperature of the solidifying bath also influences the stable formation of the cast sheet. In view of this fact, the solidifying bath is preferably maintained at a temperature lower than that of the running support. If the temperature of the solidifying bath is too high, fine bubbles can be formed on the sheet.

By controlling the temperature and concentration of the solidifying bath, the rate of extraction of NMMO from the cast sheet can be controlled through concentration gradient.

The concentration of NMMO in the solidifying bath also influences the formation of the cast sheet. In view of this fact, it is advantageous to control the concentration of NMMO in the solidifying bath to 3-50%. If the concentration of NMMO in the solidifying bath is less than 3%, fine bubbles can be formed on the sheet, and if it exceeds 50%, the rate of extraction of NMMO from the cast sheet becomes too slow, thus making the formation of a film difficult. For this reason, it is advantageous to control the concentration of NMMO in the solidifying bath to the above-specified range.

The sheet cast through the casting unit 20 is transferred to a water washing unit 30. In the water washing step, NMMO contained in the cast sheet is extracted.

The water washing must be carried out such that the concentration of NMMO in the final sheet is 50 ppm or less, in order to provide advantages in terms of the physical properties of the finally obtained film.

Any washing method may be used without any particular limitation in the present invention, as long as it can satisfy this degree of water washing. However, in terms of the efficiency of water washing and the physical properties of the film, it is preferable to use a method of sequentially washing the cast sheet by passing the cast sheet through a plurality of water washing stages sequentially disposed in the movement direction of the sheet. This will now be described with reference to the water washing unit 30 shown in FIG. 2. Purified water is supplied to each of the water washing stages such that the concentration of washing water in each washing stage is maintained at a constant level. If the supply of purified water is performed using a method of supplying purified water in a direction from a water washing stage 35 at the end in the movement direction of the sheet toward a water washing stage 31 at the entrance in the movement direction of the sheet, the concentration of NMMO in each of water washing stages 31, 32, 33, 34 and 35 can be prevented from increasing to a given level or higher, thus increasing the efficiency of extraction of NMMO from the cast sheet. Herein, the number of the water washing stages is not specifically limited, and it can be determined depending on the content of NMMO in the cast sheet 40 and can be suitably adjusted according to the extraction efficiency of each water washing stage. Preferably, the number of the water washing stages may be 3 to 12. The time during which the cast sheet passes through the water washing unit including the plurality of water washing stages can be controlled in consideration of extrusion rate and the like.

NMMO extracted through the water washing process may be recovered and recycled using a given system.

It is advantageous in terms of extraction efficiency that the water washing process is carried out in a state in which the cast sheet is immersed in the water bath of each water washing stage, but a method of extracting NMMO from the sheet while spraying water onto the cast sheet moving along the top of the water washing stage may also be used.

The efficiency of water washing in the first water washing stage (31 in FIG. 2) at the entrance in the movement direction of the cast sheet can most greatly influence the concentration of NMMO in the finally obtained film. In view of this fact, it is advantageous that the concentration of NMMO in the cast sheet is controlled to about 3-25% in the first water washing stage 31. If the concentration of NMMO in the first water washing stage is excessively high, the efficiency of extraction of NMMO from the cast sheet can be reduced.

In view of the concentration of NMMO in the finally obtained film, it is advantageous that the concentration of NMMO in the cast sheet in the last water washing stage (35 in FIG. 2) is controlled to 50 ppm or less.

The sheet from the water washing process may be dried, and then wound, thus obtaining a final cellulose-based film.

The inventive film thus obtained is a cellulose-based film which contains no sulfur therein, contains N-methylmorpholine-N-oxide content at a concentration of less than 50 ppm and is composed of a backbone of alpha-cellulose. The inventive film is environmentally harmless compared to a prior cellulose-based film (known as cellophane) prepared using a viscose process and can show the advantageous physical properties of the cellulose-based film.

Hereinafter, the present invention will be described in further detail with reference to examples, but the scope of the present invention is not limited to these examples.

EXAMPLE 1

A cellulose film was prepared using the film preparation system shown in FIG. 2.

First, a cellulose sheet (alpha-cellulose content of more than 96%, V-81, Buckeye Inc.) was powdered in a grinding machine equipped with a screen filter, and the powder was stored in a pulp powder storage tank. Then the cellulose powder and liquid NMMO (89° C.; 13% water content) were fed at feed rates of 800 g/h and 7,200 g/h, respectively, into the feed section of a twin-screw extruder (screw diameter (D)=48 mm, L/D=52) having a screw rotating speed of 120 rpm and a temperature of 80° C., such that a content of pulp in the dope was 10%. The mixture was passed through a kneading unit and a melting unit, thus preparing a uniform solution (hereinafter referred to as dope). Herein, the dope preparation apparatus was maintained at a temperature of 110° C.

The obtained dope was extruded through a T-die 21 onto a roller 22 having a transfer speed of 10 m/min. Herein, about 20% of the contact area of the roller 22 with the extruded sheet was immersed in water having a temperature of 35° C. At this time, NMMO was continuously recovered such that the concentration of NMMO in a solidifying bath 24 containing water in which a portion of the roller was immersed was maintained at a constant level of 20%.

The extruded sheet immersed in the solidifying bath while in contact with the roller being run was immersed in the bath for 3 seconds, and then it was separated from the roller 22 and transferred via a guide roll 23 to a water washing unit.

Herein, the roller 22 was made of a chromium-coated SUS material.

As shown in FIG. 2, the cast sheet was passed through the water washing unit including five water washing stages 31, 32, 33, 34 and 35, thus removing NMMO from the cast sheet. Herein, purified water was allowed to flow in a direction from the last water washing stage 35 toward the first water washing stage 31, and the NMMO concentration in the first water washing stage 31 was controlled to 15%. Also, the NMMO concentrations in the second, third and fourth water washing stages were controlled to 5%, 1% and 0.5%, respectively, and the NMMO concentration in the last water washing stage 35 was controlled to 40 ppm.

After completion of the water washing process, the cast sheet was dried and wound, thus preparing a cellulose-based film.

EXAMPLE 2

A cellulose-based film was prepared in the same manner as in Example 1, except that the content of pulp in the dope was 8%.

EXAMPLE 3

A cellulose-based film was prepared in the same manner as in Example 1, except that, in the process of casting the obtained dope through the T-die 21 onto the roller 22 having a transfer speed of 5 m/min, about 10% of the contact area of the roller 22 with the extruded sheet was immersed in water having a temperature of 50° C.

EXAMPLE 4

A cellulose-based film was prepared in the same manner as in Example 1, except that, in the water washing process, the concentrations of NMMO in the water washing stages were controlled to 10%, 5%, 2%, 0.1% and 20 ppm, respectively.

As described above, the present invention provides a method enabling a cellulose-based film to be prepared from environmentally friendly wood pulp through an environmentally friendly process. In the method of the present invention, a process for preparing alkali cellulose, a xanthation process and the like, which are carried out in a prior method of preparing a cellulose-based film through a viscose process, may be omitted so as to eliminate the use of NaOH or $H_2SO_4$, thus reducing chemical costs. Also, in the method of the present invention, process efficiency can be increased, thus reducing the use of utilities. Moreover, the method of the present invention is an environmentally friendly method in which the environmentally harmful substance $CS_2$ is not used, and thus the environmentally harmful substance $CS_2$ or $H_2S$ is not emitted. The cellulose-based film obtained according to the method of the present invention is an environmentally friendly cellulose-based film which can show excellent properties, including transparency, gloss, dimensional stability, heat resistance, oil resistance, chemical resistance and printability and, at the same time, contains no environmentally harmful substance. Thus, the cellulose-based film of the present invention can substitute for a prior cellulose-based film (i.e., cellophane), which is prepared according to a viscose process and for which Korea depends entirely on imports, thereby reducing the import dependence of the cellulose-based film.

Although the preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for preparing a cellulose-based film, the method comprising the steps of:
    preparing a dope of a composition comprising 5-15 wt % of a pulp having an alpha-cellulose content of more than 90% and 85-95 wt % of an aqueous N-methylmorpholine-N-oxide solution;
    extruding the dope from a die onto a running support;
    casting the extrudate to form a sheet;
    washing the cast sheet with water to remove N-methylmorpholine-N-oxide therefrom; and
    drying the washed sheet,
    wherein the running support is placed with a gap from the die and immersed partially in a solidifying bath so that the extrudate from the die is brought to contact with the running support at a position of the running support where the running support is not immersed in the solidifying bath; and
    wherein the running support is allowed to run while being partially immersed in the solidifying bath containing N-methylmorpholine N-oxide, the concentration of said N-methylmorpholine N-oxide being controlled to be 3~50%, so that the casting of the extrudate is carried out in air first and then in the solidifying bath.

2. The method of claim 1, wherein the step of preparing the dope is carried out at a temperature of 90-150° C.

3. The method of claim 1, wherein an additive is used in the step of preparing the dope.

4. The method of claim 3, wherein the additive is an additive for minimizing the degradation of cellulose at high temperature or plasticizer.

5. The method of claim 1, wherein the concentration of N-methylmorpholine-N-oxide in the aqueous N-methylmorpholine-N-oxide solution is 85-95 wt %.

6. The method of claim 1, wherein the running support is in the form of a roll or a belt.

7. The method of claim 1, wherein the step of casting the extrudate to form the sheet is carried out in such a manner that about 20-80% of the area of the running support, which is in contact with the extruded sheet, is immersed in the solidifying bath.

8. The method of claim 1, wherein the step of casting the extrudate to form the sheet is carried out such that the extruded sheet coming in contact with the running support is separated from the running support at least 1 second after the immersion thereof in the solidifying bath.

9. The method of claim 1, wherein the step of casting the extrudate to form the sheet is carried out such that the cast film is separated from the running support at least 3 seconds after its immersion in the solidifying bath.

10. The method of claim 6, wherein the temperature of the running support is higher than 0° C. and, at the same time, lower than the temperature of the extrudate by 10° C.

11. The method of claim 6, wherein the running support is made of an SUS material having one coating layer selected from the group consisting of a hard chromium coating, a tungsten carbide coating, an alumina-based ceramic coating, a titanium coating and a titanium oxide coating.

12. The method of claim 1, wherein the solidifying bath is maintained at a temperature lower than the temperature of the running support.

13. The method of claim 1, wherein the washing step is carried out such that the concentration of N-methylmorpholine-N-oxide in the washed sheet is less than 50 ppm.

14. The method of claim 1, wherein the washing step is carried out using a method of sequentially washing the cast sheet by passing the sheet through a plurality of water washing stages sequentially disposed in the movement direction of the sheet.

15. The method of claim 14, wherein the washing step is carried out using a method of supplying purified water so as to maintain the concentration of washing water in each water washing stage at a constant level, in which the supply of purified water is carried out by allowing purified water to flow in a direction from a water washing stage at the end in the movement direction of the sheet toward a water washing stage at the entrance in the movement direction of the sheet.

* * * * *